United States Patent [19]

Nakayama et al.

[11] Patent Number: 5,315,451
[45] Date of Patent: May 24, 1994

[54] ROTATING STORAGE TRACK FORMAT EMULATION

[75] Inventors: Masahiro Nakayama; Hisaharu Takeuchi; Hisashi Takamatsu; Mamoru Tohchi; Akira Kurano, all of Odawara, Japan

[73] Assignee: Hitachi, Ltd., Tokyo, Japan

[21] Appl. No.: 755,189

[22] Filed: Sep. 5, 1991

[30] Foreign Application Priority Data

Sep. 6, 1990 [JP] Japan .................. 2-236705

[51] Int. Cl.⁵ .................. G11B 15/18; H04N 5/78
[52] U.S. Cl. .................. 360/72.2; 360/331; 360/77.02; 360/77.07; 360/77.08; 369/54; 369/84; 369/275.3
[58] Field of Search .................. 360/72.2, 25, 33.1, 360/77.02, 77.07, 77.08; 369/54, 84, 275.3

[56] References Cited

U.S. PATENT DOCUMENTS

| | | | |
|---|---|---|---|
| 3,997,876 | 12/1976 | Frush | 360/27 |
| 4,586,093 | 4/1986 | Fukuju et al. | 360/72.2 |
| 4,680,653 | 7/1987 | Ng et al. | 360/72.2 |
| 4,731,679 | 3/1988 | O'Gwynn et al. | 360/72.2 |
| 5,055,938 | 10/1991 | Misumi et al. | 360/25 |

FOREIGN PATENT DOCUMENTS 62-281167 12/1987 Japan .

*Primary Examiner*—Margaret Rose Wambach
*Attorney, Agent, or Firm*—Fay, Sharpe, Beall, Fagan, Minnich & McKee

[57] ABSTRACT

A method of emulating an original record format for a new rotating storage device, including the steps of;
(a) determining an original angular position ($\alpha$) of a record according to a first recording format;
(b) determining a desirable angular position ($\beta$) for recording according to a second recording format having a higher recording density than that of the first recording format;
(c) subtracting the desirable angular position from the original angular position to obtain a difference between the angles ($\alpha$-$\beta$); and
(d) incrementing a gap length immediately before the data field of the record when the angular position exceeds a value corresponding to one unit of segment.

14 Claims, 6 Drawing Sheets

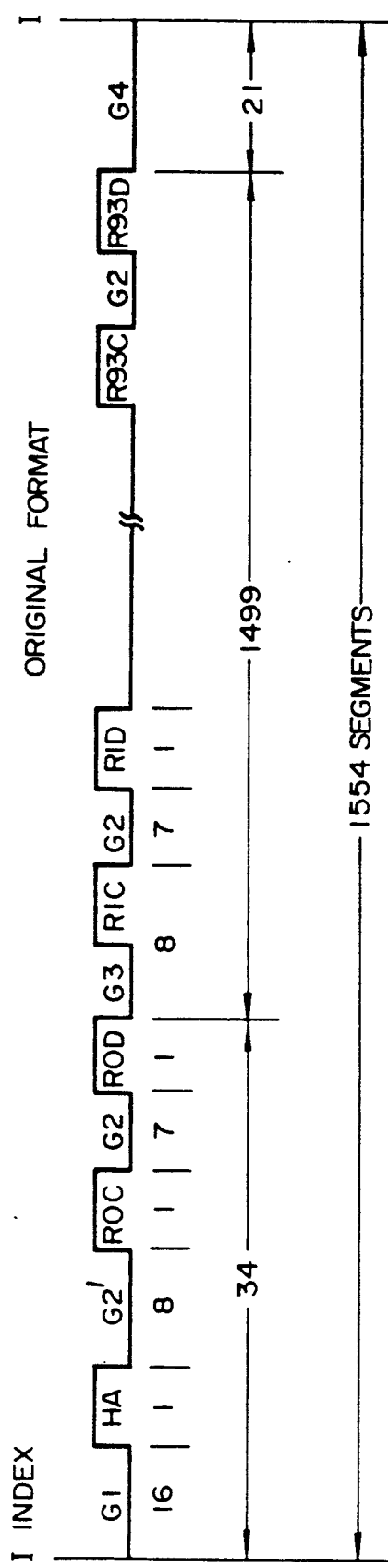
FIG. 1A TRACK STRUCTURES OF ORIGINAL AND NEW DEVICES
ORIGINAL FORMAT
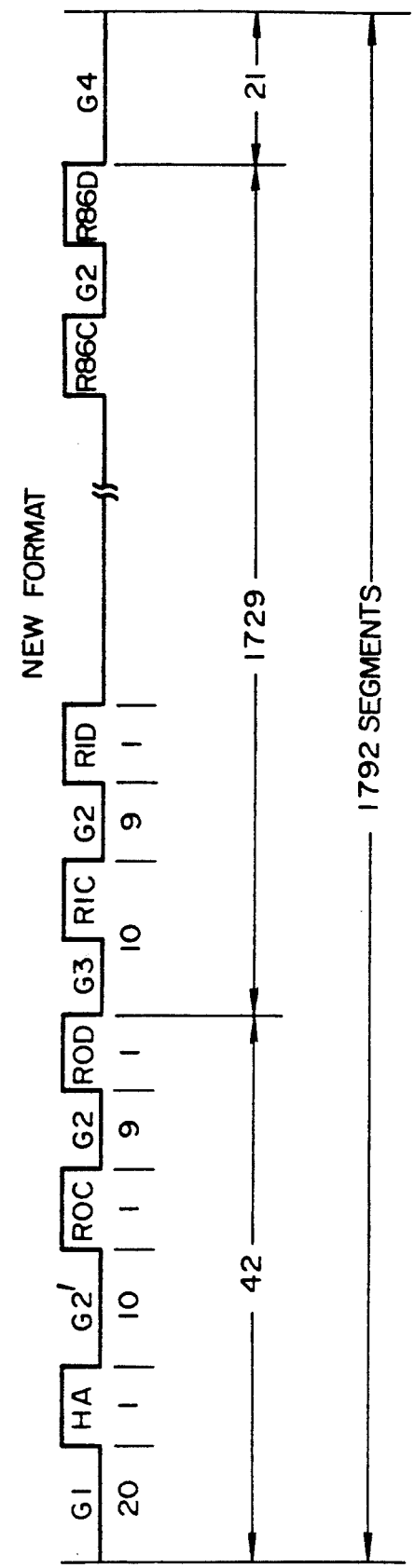
FIG. 1B NEW FORMAT

ROTATING STORAGE TRACK FORMAT EMULATION

BACKGROUND OF THE INVENTION

The present invention relates to an emulation technique for a rotating storage device, and more particularly, to a technique which can be effectively applied to an emulation of a magnetic disk unit handling a variable-length record.

There has been a remarkable improvement in the recording density of information recorded on a recording medium such as a magnetic disk device, which is a kind of a rotating storage device. A higher-performance product is being developed to replace the existing ones in a relatively short period of time. On the other hand, an electronic computer system using the magnetic disk devices as external storage devices faces both economic and time difficulties in immediately introducing the specification of a newly-developed magnetic disk device (hereinafter to be referred to as a new device) into the system for operation because the total system is of a large scale at high cost, and it takes a relatively long time to develop an operating system, which is the basic software for operating the system. Accordingly, it becomes necessary to eliminate these difficulties encountered during the period of a change of the system, by employing an emulation technique which makes a newly-introduced magnetic disk device to carry out an artificial operation which is equivalent to the operation of an original magnetic disk device currently used in the system, and it is also necessary to effectively utilize the physical high-performance property (data transfer speed) of the new device. In the case of emulating a complex recording format such as the one of the count key data system on a new device having different specifications with an increased track capacity by an improvement of the recording density, there is a problem that a record of the improved recording density which is written following the rotating reference position does not match in its record writing angle with the angle of the original disk format in the circumferential direction, or the sector positions do not coincide with each other, so that it becomes difficult to carry out normal recording and reproducing operations.

In order to solve the above problem, a technique is known which makes sector positions to coincide by extending a gap between one record and the next record, such as the technique of recording and reproducing a record by changing over between the native specifications and the emulation specifications, as disclosed in the U.S. Pat. No. 4,680,653 and JP-A-62-281167 corresponding thereto, for example.

The above-described prior-art technique is acceptable when there is sufficient room in the capacity of the track on a new device. However, it has the following problem when there is a limit to the track capacity.

When a record is written, the record writing position depends on the length of the track on which the preceding record has been written; in other words, the difference between an index of a reference point of the track and the end point of the preceding record position.

Therefore, the number of gaps increases when short records are written continuously by using an increased gap length of the native specifications in the new device.

Accordingly, there arises a problem that the number of records that can be written on one track in the original device cannot be accommodated within one track in the new device.

An example of the above-described problem of emulation in the original device and the new device having mutually different specifications will be explained in detail with reference to FIGS. 1A and 1B and FIGS. 2A to 2C. FIGS. 1A and 1B are conceptual diagrams to show a comparison in the two drawings between an example of the capacity of the track in the original device and an example of the capacity of the track in the new device. FIGS. 2A to 2C are conceptual diagrams showing one example each of setting a size of a record based on minimum segments for the record.

Track capacity will be explained first. The original device, for example, H-6586 of Hitachi, Ltd., has its one track divided into 222 sectors, each sector comprising seven segments.

One segment comprises 32 bytes. A gap G1 disposed between an index I and a home address field HA comprises 16 segments, a gap G2' between the home address field HA and a count field R0C of a header record R0 comprises eight segments, a gap G2 between a count field RnC and a data field RnD (n=0-93) of each record comprises seven segments, and a gap G3 between the header record R0 and a count field R1C of a next record R1 comprises eight segments including the corresponding count field R1C. A gap G4 disposed at the end of the track is provided to compensate for defects of the medium on the track, and three segments are allocated per one defect, the gap G4 comprising 21 segments to be able to compensate for a total of seven defects. As a result, one track has 1554 segments in total.

The new device, H-6587 of Hitachi, Ltd., for example, has its one track divided into 224 sectors, each sector comprising eight segments. One segment comprises 34 bytes. The gap G1 comprises 20 segments, the gap G2' comprises 10 segments, the gap G2 comprises 9 segments, the gap G3 comprises 10 segments including the count field RnC, and the gap G4 comprises 21 segments for a total of seven defects, three segments being allocated to one defect. One track has 1792 segments in total. The new device has a higher recording density than that of the original device.

Setting of a record size based on a segment will be explained below.

A minimum record having no key field K comprises a count field C of one segment and a data field D.

In the original device, 16 segments are necessary as minimum record segments (as shown in FIG. 2A) and 93 records can be accommodated in one track because record 0 is excluded from the user record.

On the other hand, 20 segments are necessary in the native (i.e., pre-emulation) mode of the new device (as shown in FIG. 2B) and 86 records can be accommodated in one track, thus generating a problem that seven records (93-86) cannot be accommodated.

In order to set the number of records per track in the new device to be equal to the number of records per track in the original device, it is considered appropriate to reduce the size of the gaps. However, gaps between records are provided to generate a command execution time of a host channel in a continuous record processing, and therefore, a mere reduction of the size of the gaps between the records generates another problem in that a command overrun may easily occur; that is, the execution of a command is not completed in time for the arrival of the next record, in a continuous record processing.

Each time a command overrun occurs, it becomes necessary to wait for a rotation, causing a substantial reduction in the data transfer quantity (throughput) per unit time between the magnetic disk device and the high-order channel.

SUMMARY OF THE INVENTION

It is an object of the present invention to provide an emulation system for a rotating storage device which can eliminate generation of a time of waiting for a rotation due to a command overrun at the time of emulation.

It is another object of the present invention to provide an emulation system for a rotating storage device which makes it possible for a new rotating storage device to accommodate a maximum number of records on a track that are kept on the track of an old rotating storage device, without causing a reduction of the performance of the new rotating storage device.

The above and other objects of the present invention and new characteristics of the present invention will be apparent from the description of the present specification and the attached drawings.

An original angular position record on the rotating storage in the original recording format is determined, and then a desirable angular position of a record is determined for the rotating storage in the new recording format which has a higher recording density than that of the original recording format. When the difference of the two angles, that is the former angle minus the latter angle, is larger than an angle corresponding to one data unit or one segment or the new recording format, a gap length immediately before the data field of this record is incremented by one segment.

The emulation system for rotating storage device of the present invention makes it possible that the recording format in a first rotating storage device is realized in a second rotating storage device of which specifications are different from those of the first rotating storage device, and the emulation system also makes it possible to format a record by setting a maximum-length gap obtainable while guaranteeing a maximum accommodation number of minimum records on one track.

Further the emulation system for a rotating storage device of the present invention makes it possible that the recording format in a first rotating storage device is realized in a second rotating storage device of which specifications are different from those of the first rotating storage device, and the emulation system sets a variable length to at least one of the gaps between control fields included in individual records and the gaps between records, in accordance with the length of a record to be written.

Description will be made of one example of the operation of the emulation system of the present invention, by taking an example of writing 256-byte data on a track, as shown in FIGS. 3A to 3C.

A data field of the original device comprises 256-byte data and a 12-byte error correction code (ECC). Therefore, the data field has 288 (32×9) bytes using nine segments and including pad data and the ECC.

When the data transfer speed between the host device and the original device is 3MB/sec., the size of the data field is converted to about 96 μ seconds in terms of time.

On the other hand, in the new device, a sub ECC of six bytes is added to each record at every seven segments from the starting point of a data field, and an ECC of 12 bytes is added to the last. Accordingly, the data field has 306 (34×9) bytes using nine segments and including pad data and the ECC.

When the data transfer speed is 4.2 MB/sec., the size of the data field is converted to about 73 μ seconds in terms of time.

In other words, there is a size difference of 23 μ seconds between the data field of the old device and the data field of the new device, and this difference corresponds to 2.8 segments in the new device.

In the present invention, when one segment from the above difference is allocated to the gap G2 before the data field, for example, it becomes possible to realize a maximum accommodation number of records that are accommodated on one track of the old device, without generating a waiting time for a rotation or a malfunction due to a command overrun due to a shortage of a gap length or the like.

Further, according to the present invention, it is also possible to set a gap length in accordance with a data length for formatting, instead of setting short gaps for all gaps.

As an example, description will be made of a case where the number of records to be accommodated in one track and the length of the records are clear in advance based on information from the host device.

The size of the track of the new device to be emulated is divided by the number of records, thereby to obtain a number of segments that can be allocated to each record.

A number of segments including gaps for one record is calculated based on the length of the record. In this case, a short length is assumed for the gaps.

Next, the number of segments of one record is subtracted from the number of segments that can be allocated to one record. Based on the result of this subtraction, a length of the gap between the fields is determined.

When the surplus, which is the result of the subtraction, is 0, the short gap which was initially assumed is used.

When the surplus is 1, the one segment is allocated to the gap G2 immediately before the data field.

When the surplus is two or larger, a maximum segment length obtainable can be allocated to the gap G2 immediately before the key field and the data field, respectively.

Since the count field of the record is referred to in advance, there is no problem of malfunction in the processing of individual records even if a variable-length gap is set as described above.

BRIEF DESCRIPTION OF THE DRAWINGS

FIGS. 1A and 1B are conceptual diagrams showing a comparison of an example of the track capacity of an original device and the track capacity of a new device, respectively;

DESCRIPTION OF THE PREFERRED EMBODIMENT

An embodiment of the emulation system for the rotating storage device will be explained in detail with reference to the drawings.

In the present embodiment, a magnetic disk device will be used as an example of the rotating storage device, and the count key data (CKD) system will be explained as an example of the recording format.

Figure 2A:
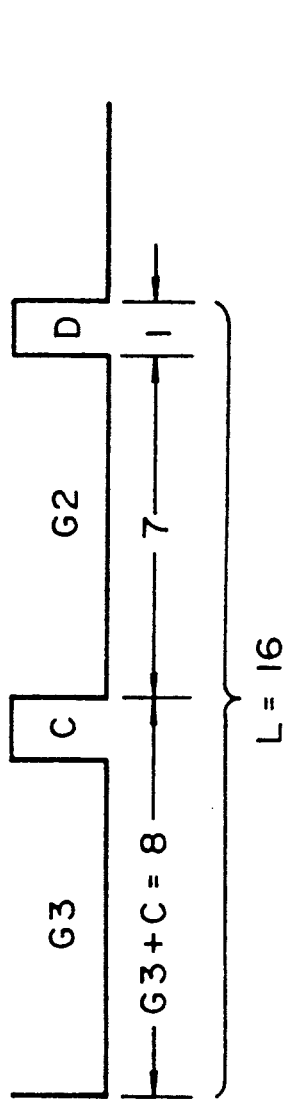
FIGS. 2A to 2C are conceptual diagrams showing an example of size setting of a record based on a minimum segment size of the record.
Figure 2B:
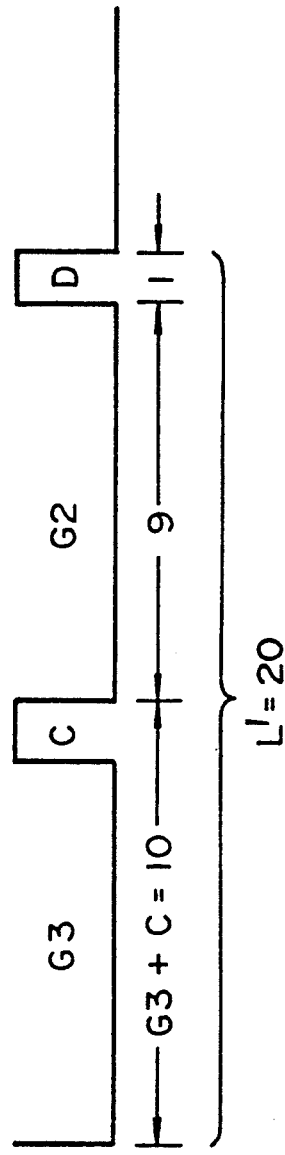
Figure 2C:
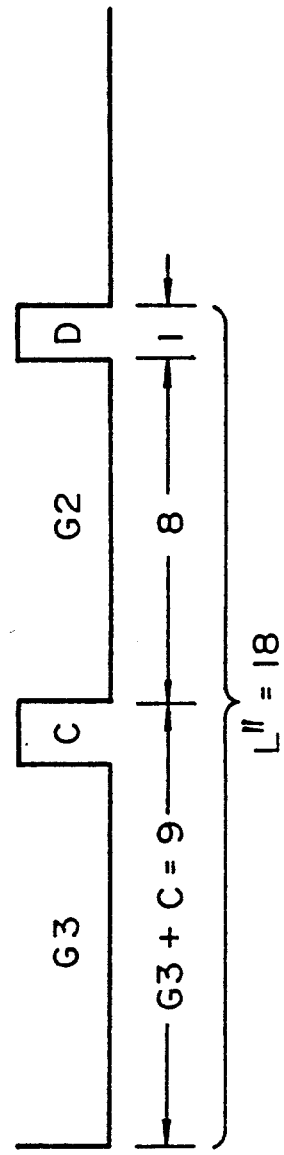
Figure 3A:
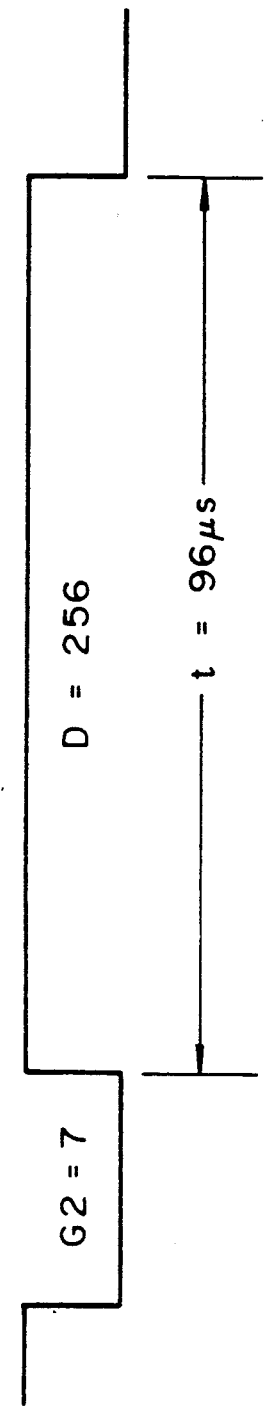
FIGS. 3A to 3C are conceptual diagrams showing a comparison, between the native state and the emulation state, of sizes of gaps set in accordance with a data field of a specific length in the original device and the new device, respectively.
Figure 3B:
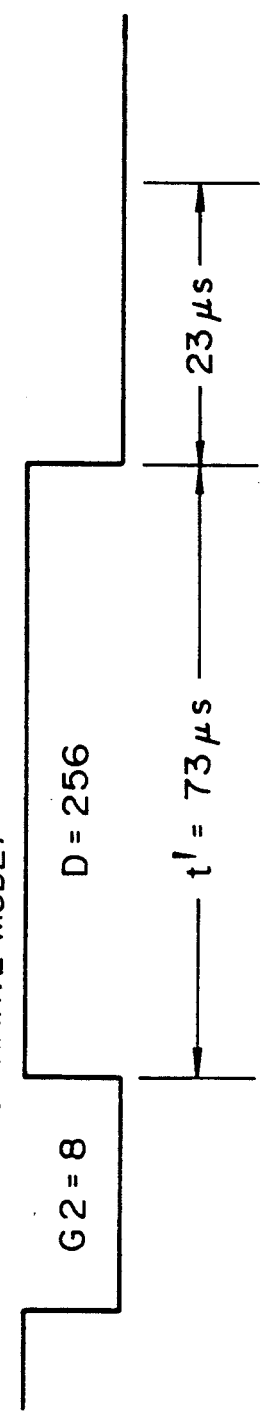
Figure 3C:
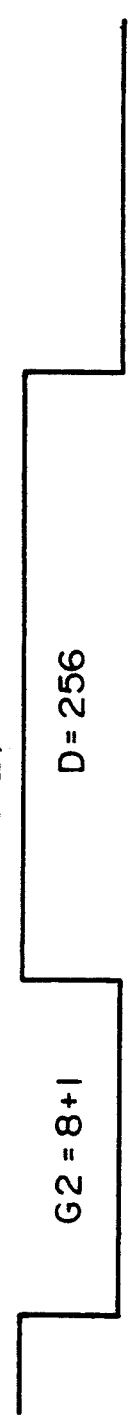
Figure 4A:
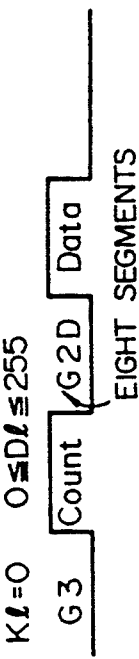
FIGS. 4A to 4E are conceptual diagrams showing an example of setting a gap length in the emulation system of the rotating storage device in one embodiment of the present invention.
Figure 4B:
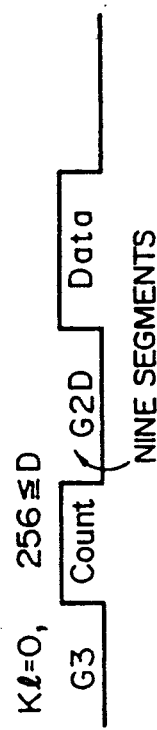
Figure 4C:
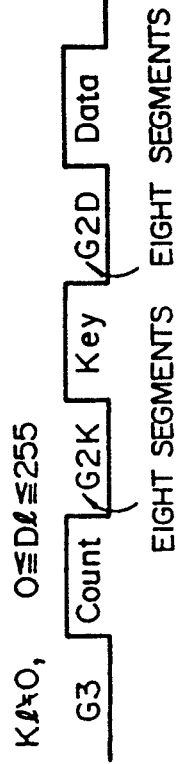
Figure 4D:
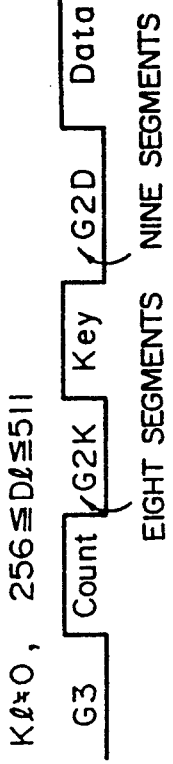
Figure 4E:
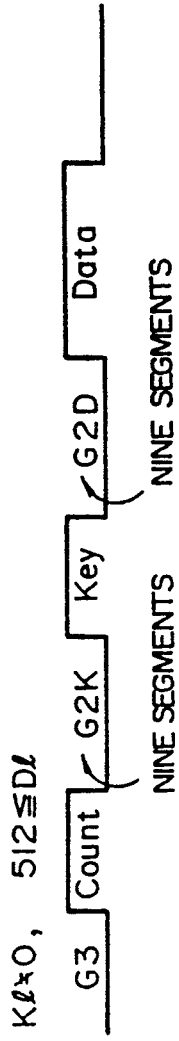
Figure 5:
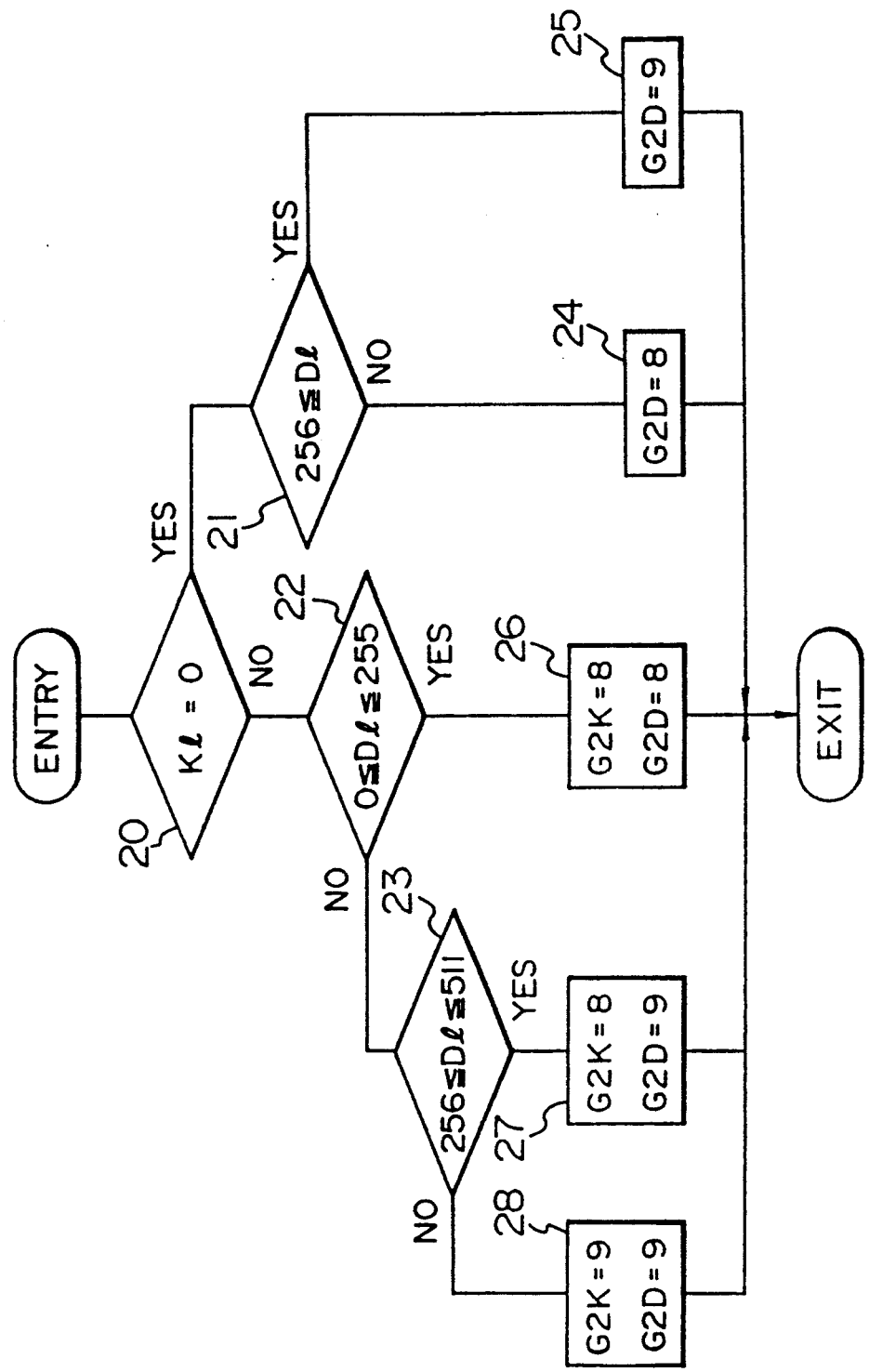
FIG. 5 is a flow chart showing one example of the operation of the present invention.

FIGS. 4A to 4E are conceptual digrams showing one example of setting a gap length in the emulation system for the rotating storage device which is one embodiment of the present invention, and FIG. 5 is a flow chart showing one example of the operation of this system.

Figure 6:
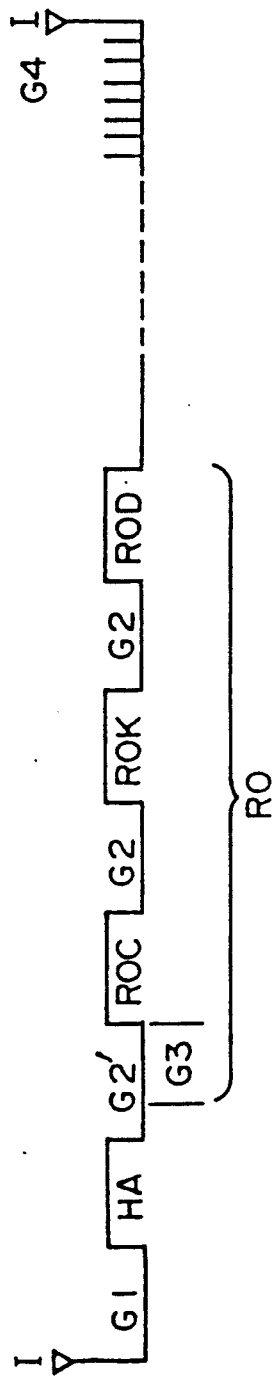
FIG. 6 is a conceptual diagram showing one example of the recording format in accordance with the CKD system on individual tracks.
Figure 7:
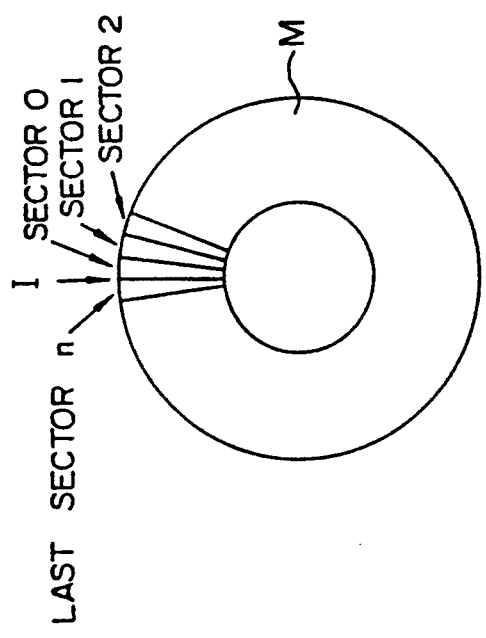
FIG. 7 is an explanatory diagram showing one example of the sector arrangement on a recording medium.

FIG. 6 is a conceptual diagram showing one example of the recording format made on individual tracks according to the CKD system, and FIG. 7 is an explanatory diagram showing one example of the sector arrangement on a recording medium.

FIG. 7 illustrates a disk-shaped recording medium M divided to have a plurality of sectors 0 to n and to form tracks which are coaxially disposed by crossing these sectors in the circumferential direction, and FIG. 6 shows a track of FIG. 7 developed linearly.

An index I showing the starting point of a track, a gap G1 and a home address field HA on which various management information relating to this track is recorded, are sequentially disposed on individual tracks having the format of the CKD system, as shown in FIG. 6.

After the home address field HA, a gap G2' is placed followed by records R0 through Rn. Each of the records Rn (n=0, 1, 2, ...) comprises a count field RnC on which management information of the record is recorded, a key field RnK on which index information of the record is recorded, and a data field RnD, with a gap G2 disposed between the RnC and RnK and between the RnK and the RnD. A gap G3 is disposed between adjacent records, or immediately before the count field RnC of individual records Rn after the record R1. It can be freely decided whether the key field RnK is to be provided or not within the individual records Rn, so that the key field RnK and the gap G2 immediately before the RnK may or may not exist depending on the situation.

A gap G4 is disposed at the end of the individual tracks, to provide a replacement area for replacing a defect area which occurs within any of the tracks.

Each of the above fields and gaps is set by allocating an integer number of segments of a desired recording unit.

The number of segments that make upstructuring a gap, i.e., the gap length, differs depending on the specifications of the magnetic disk device. Usually, the number of segments is set to a value which can account for the time required for a record processing by a microprogram in an input and output control mechanism or the like (not shown in the diagram).

An example of a system for determining a length of the gap G2 on the track of a new device which emulates the recording format of an original device will be explained below with reference to the flow chart shown in FIG. 5. The following control operation is realized by, for example, a microprogram in the input and output control mechanism of the new device. To facilitate the explanation, it is assumed that 256 bytes are used for the total data length.

At first, a format write command is transmitted as a host command from a host device such as a channel. The parameter of the format write command includes a key field length K1 and a data field length D1.

Having received the format write command, the microprogram of the input and output control mechanism checks for the presence or absence of a key field by checking whether the key field length K1 is 0 or not, before. starting the format write operation (Step 20).

When there is no key field (K1=0), the microprogram further checks whether the data field length D1 is equal to or smaller than 255 bytes, to determine a gap length G2D of the gap G2 between the count field and the data field (Step 21).

When it is decided that the data field length D1 is a short record smaller than 256 bytes, it becomes necessary to set eight segments as the length G2D of the gap G2 as shown in FIG. 4A in order to make compatible of the number of records for a simulation, because it is anticipated that the number of the gaps G2 to be written on the track and the number of data fields will increase (Step 24).

When the data field length D1 is equal to or larger than 256 bytes, nine segments are set as the length G2D of the gap G2 as shown in FIG. 4B (Step 25).

When it is decided in Step 20 that the format write command includes the key field (K1≠0), the microprogram checks whether the data field length D1 is 255 bytes or smaller, to determine the gap length G2K of the gap G2 between the count field and the key field (Step 22).

When the data field length D1 is 255 bytes or smaller, eight segments are allocated respectively to the gap length G2K of the gap G2 between the count field and the key field, and to the gap length G2D of the gap G2 between the key field and the data field, as shown in FIG. 4C (Step 26).

When it is decided in Step 22 that the data field length D1 exceeds 255 bytes, the microprogram further checks whether the data field length D1 is 511 bytes or smaller (Step 23).

When the data field length D1 is not smaller than 256 bytes and not larger than 511 bytes, eight segments are set as the gap length G2K of the gap G2 between the count field and the key field, and nine segments are set as the gap length G2D of the gap G2 between the key field and the data field, as shown in FIG. 4D (Step 27).

When it is decided in Step 23 that the data field length D1 is not smaller than 512 bytes, nine segments are set to both the gap length G2K and the gap length G2D, as shown in FIG. 4E (Step 28).

It is very rare that the record length is short on the magnetic disk device when it is used as an external storage device, and usually the record length of 4K bytes or above is used. Therefore, a record is usually written by using a large gap.

As described above, according to the emulation system for the rotating storage device of the present embodiment, it is possible to accurately emulate the recording format of an original device without waiting for a rotation due to a command overrun.

Further, according to the emulation system of the present embodiment, a new rotating storage device can accommodate on its track a maximum number of records on the track of an original rotating storage device, without lowering the performance of the new device.

In the above, a detailed description has been made of the invention made by the present inventor based on the embodiment. The application of the present invention, however, is not limited to the above-described embodiment but can be modified freely within the scope of the claims.

We claim:

1. A method of emulating for a rotating storage device having a plurality of tracks divided into a plurality of segments, comprising the steps of:
   determining an original angular position ($\alpha$) of a record according to a first recording format;
   determining a desirable angular position ($\beta$) for recording according to a second recording format having a higher recording density than that of said first recording format;
   determining a first value representing a difference between said desirable angular position and said original angular position; and
   incrementing a first gap length within said record when said first value exceeds a second value corresponding to one segment length.

2. A method of emulating for a rotating storage device according to claim 1, wherein said step of incrementing is continued to be carried out to a maximum until said first gap length equals the length of a corresponding gap in a native mode of a system according to the second recording format.

3. A method of emulating for a rotating storage device according to claim 1, wherein an original segment length is different from a new segment length as a parameter, said new segment length is selected as said one segment length.

4. A method of emulating for a rotating storage device according to claim 1, wherein said incrementing step is performed to increment a gap length immediately before a data field of said record as said first gap length.

5. A method of emulating for a rotating storage device according to claim 4, wherein said record includes a key field, and said method further comprises the step of incrementing a second gap length immediately before said key field when said first value exceeds said second value.

6. A method of emulating for a rotating storage device according to claim 1, further comprising the step of incrementing a second gap length between adjacent records when said first value exceeds said second value.

7. A method of emulating for a rotating storage device according to claim 1, wherein said record includes a key field, and wherein said incrementing step is performed to increment a gap length immediately before said key field as said first gap length.

8. An emulation method for changing a gap length between CKD fields in a record during realization of a first recording format storage device having a second recording format different from said first recording format of said first rotating storage device, wherein said second recording format has a recording density higher than that of said first recording format, each of said first and second recording formats having a variable length of records, the angular position from a start of each record being deducible from a data length of a record, said emulation method comprising the steps of:
   calculating, in advance, an angular difference between rotation angles corresponding to data lengths of records of said first and second rotating storage devices to obtain a data length of records of said second rotating storage device, the data length being an integral number of times a segment length of said second rotating storage device, and
   obtaining a segment number, when a data length of each record is provided, corresponding to an angular difference of said provided data length, and adding said obtained segment number to a segment number of a record gap placed before a data field having said provided data length as a new record gap.

9. An emulation method according to claim 8, wherein said segment number of said record gap is smaller than or equal to a gap length of a native mode of said second recording format of said second rotating storage device.

10. An emulation method according to claim 8, wherein said first and second recording formats are included in a C/K/D system with a count field C, a data field D and a key field K and, when a record includes a key fields, a gap length before each key field on said second rotating storage device is determined by adding one-half of a segment number of said angular difference of a data field, and by adding the other half of the segment number of said angular difference to a minimum gap length as a gap length before each data field.

11. A method of emulating for a rotating storage device for making a second rotating storage device to be able to have a recording format of a first rotating storage device, said second rotating storage device having recording specifications different from those of said first rotating storage device, including the steps of:
   (a) receiving a record length, as a parameter from a host device;
   (b) setting a maximum gap length within said record length while guaranteeing a maximum accommodation number of minimum-length records within one track according to the record length parameter; and
   (c) formatting a record to have definite field and gap lengths according to the maximum gap length, the recording format of the first rotating storage device and the recording specifications of the second rotating storage device.

12. A method of emulating for a rotating storage device according to claim 11, wherein said formatted record is recorded by the count key data system.

13. A method of emulating for a rotating storage device according to claim 12, further comprising the steps of determining a size of a data field of the formatted record, and incrementing a gap length within said formatted record based on a result of the determining step to determine a record length of said formatted record.

14. A method of emulating for a rotating storage device according to claim 13, wherein said formatted record including the gap length incremented by said incrementing step has a data starting angular position set larger than an angular position of a record in a native mode based on an index mark.

* * * * *